(12) United States Patent
Blatter (10) Patent No.: US 6,265,002 B1
(45) Date of Patent: Jul. 24, 2001

(54) NON-HERMETIC SEAL FOR INDIVIDUALLY WRAPPED FOOD ITEMS

(75) Inventor: René Blatter, Vaud (CH)

(73) Assignee: Kustner Industries S.A. (CH)

( * ) Notice: Subject to any disclaimer, the term of this patent is extended or adjusted under 35 U.S.C. 154(b) by 0 days.

(21) Appl. No.: 09/349,700

(22) Filed: Jul. 8, 1999

Related U.S. Application Data (60) Provisional application No. 60/112,931, filed on Dec. 18, 1998.

(51) Int. Cl.$^7$ .................................................... B65D 85/00
(52) U.S. Cl. ........................... 426/108; 426/115; 426/118; 383/103; 229/87.05
(58) Field of Search ..................................... 426/108, 115, 426/130, 118, 395, 394, 410; 53/434, 479, 451, 459; 383/37, 100, 103; 229/87.05; 206/484, 390, 554

(56) References Cited

U.S. PATENT DOCUMENTS

| | | |
|---|---|---|
| 1,546,963 | 7/1925 | Biernbaum . |
| 2,133,348 | 10/1938 | Ferenci ........................................ 93/2 |
| 2,134,862 | 11/1938 | Dunnam ...................................... 93/3 |
| 2,156,466 | 5/1939 | Vogt ............................................ 93/3 |
| 2,160,367 | 5/1939 | Maxfield ..................................... 93/3 |
| 2,460,460 | 2/1949 | Langer ..................................... 154/42 |
| 2,505,603 | 4/1950 | Brandenberger ........................ 99/171 |
| 2,529,732 | 11/1950 | Howard ................................... 154/1 |
| 2,613,488 | 10/1952 | Attride ..................................... 53/58 |
| 2,759,308 | 8/1956 | Nawrocki ............................... 53/122 |
| 2,803,100 | * 8/1957 | Aalseth ................................... 53/182 |
| 3,001,348 | 9/1961 | Rado ....................................... 53/182 |
| 3,108,881 | * 10/1963 | Shaw et al. ............................ 426/412 |
| 3,140,572 | 7/1964 | Petersen et al. ......................... 53/28 |
| 3,182,430 | 5/1965 | Hoeppner ................................. 53/29 |
| 3,237,367 | 3/1966 | Fievet ..................................... 53/122 |
| 3,300,944 | 1/1967 | Thesing .................................... 53/28 |
| 3,325,961 | 6/1967 | Lindh et al. .............................. 53/28 |
| 3,378,988 | 4/1968 | McClosky .............................. 53/180 |
| 3,388,525 | 6/1968 | Thesing et al. .......................... 53/39 |
| 3,395,915 | 8/1968 | Clausen et al. ........................ 271/74 |
| 3,405,861 | 10/1968 | Bush ...................................... 229/51 |
| 3,469,363 | 9/1969 | Berckmoes .............................. 53/25 |
| 3,498,019 | 3/1970 | Rait ......................................... 53/28 |
| 3,532,516 | 10/1970 | Erekson ................................. 99/174 |
| 3,542,568 | * 11/1970 | Bouyer ................................ 426/128 |
| 3,542,570 | 11/1970 | Bush et al. ............................ 99/178 |
| 3,544,340 | 12/1970 | Miller et al. .......................... 99/178 |
| 3,598,615 | 8/1971 | Chamberlain ......................... 99/194 |
| 3,623,653 | 11/1971 | Work .................................... 229/87 |

(List continued on next page.)

FOREIGN PATENT DOCUMENTS

| | | | |
|---|---|---|---|
| 10 96 827 | * | 1/1961 | (DE) . |
| 901 127 | * | 7/1962 | (GB) . |

* cited by examiner

*Primary Examiner*—Milton Cano
*Assistant Examiner*—Sherry A. Dauerman
(74) *Attorney, Agent, or Firm*—Hale and Dorr LLP (57) ABSTRACT

The disclosed packet is formed from flexible wrapping material. The packet defines an interior volume and includes a seal area. The seal area includes a plurality of sealed strips and a plurality of unsealed strips. At least one unsealed strip is disposed between each pair of sealed strips. Each of the sealed strips includes two portions of the wrapping material that have been bonded together. Each of the unsealed strips includes two adjacent portions of the wrapping material that have not been bonded together. Each of the sealed strips also includes at least one void area. Each void area includes two adjacent portions of the wrapping material that have not been bonded together. The void areas and the unsealed strips provide at least one continuous unsealed path from the interior of the packet through the seal area to an external environment.

6 Claims, 9 Drawing Sheets

U.S. PATENT DOCUMENTS

| | | | |
|---|---|---|---|
| 3,623,891 | 11/1971 | Coffey | 99/178 |
| 3,634,099 | 1/1972 | Wilson | 99/171 |
| 3,688,468 | 9/1972 | Erekson | 53/122 |
| 3,693,319 | 9/1972 | Hunsader | 53/123 |
| 3,838,549 | 10/1974 | Pepmeier | 53/14 |
| 3,848,757 | 11/1974 | Jordan | 214/152 |
| 3,851,068 | 11/1974 | Kraft | 426/130 |
| 3,913,299 | 10/1975 | Stenstrom | 53/127 |
| 3,924,051 | 12/1975 | Wiggins et al. | 428/520 |
| 3,930,350 | 1/1976 | Reid | 53/22 |
| 3,937,395 * | 2/1976 | Lawes | 229/62.5 |
| 4,015,021 | 3/1977 | Harima et al. | 426/393 |
| 4,074,504 | 2/1978 | Greenawalt et al. | 53/22 |
| 4,106,265 | 8/1978 | Aterianus | 53/180 |
| 4,139,978 | 2/1979 | Jensen et al. | 53/167 |
| 4,183,964 | 1/1980 | Vinokur | 426/412 |
| 4,199,919 | 4/1980 | Moscatelli | 53/552 |
| 4,205,504 | 6/1980 | Gregoire et al. | 53/520 |
| 4,262,473 | 4/1981 | Brooke | 53/450 |
| 4,299,075 | 11/1981 | Gram | 53/550 |
| 4,426,401 | 1/1984 | Ottow et al. | 426/394 |
| 4,437,853 | 3/1984 | Metz | 493/302 |
| 4,467,589 | 8/1984 | van Maanen | 53/450 |
| 4,506,494 | 3/1985 | Shimoyama et al. | 53/551 |
| 4,524,567 | 6/1985 | Patelli | 53/552 |
| 4,530,632 | 7/1985 | Sela | 414/35 |
| 4,543,769 | 10/1985 | Schmitz | 53/450 |
| 4,549,657 * | 10/1985 | Martinq | 206/610 |
| 4,586,317 | 5/1986 | Bussell | 53/451 |
| 4,599,850 | 6/1986 | Kopp | 53/451 |
| 4,620,826 | 11/1986 | Rubio et al. | 414/73 |
| 4,630,426 | 12/1986 | Gentry | 53/428 |
| 4,637,199 | 1/1987 | Steck et al. | 53/451 |
| 4,712,357 | 12/1987 | Crawford et al. | 53/450 |
| 4,745,731 | 5/1988 | Talbott et al. | 53/451 |
| 4,759,170 | 7/1988 | Sawa et al. | 53/551 |
| 4,792,457 | 12/1988 | Brna et al. | 426/574 |
| 4,807,426 | 2/1989 | Smith | 53/550 |
| 4,876,842 | 10/1989 | Ausnit | 53/410 |
| 4,907,393 | 3/1990 | Omori et al. | 53/410 |
| 4,947,623 | 8/1990 | Saito et al. | 53/493 |
| 4,949,846 | 8/1990 | Lakey | 206/484 |
| 5,053,239 | 10/1991 | Vanhatalo et al. | 426/412 |
| 5,056,295 | 10/1991 | Willaims | 53/450 |
| 5,112,632 | 5/1992 | Meli et al. | 426/392 |
| 5,347,792 | 9/1994 | Meli et al. | 53/450 |
| 5,619,844 | 4/1997 | Meli et al. | 53/550 |

NON-HERMETIC SEAL FOR INDIVIDUALLY WRAPPED FOOD ITEMS

CROSS-REFERENCE TO RELATED APPLICATION

This application claims priority of pending Provisional application No. 60/112,931 filed on Dec. 18, 1998.

BACKGROUND OF THE INVENTION

The present invention relates to non-hermetic seals. More specifically, the present invention relates to non-hermetic seals used for sealing individually wrapped items of food and to methods and apparatus for forming such non-hermetic seals.

Figures 1A, 1B, 1C, 1D, 1E, 1F, 1G, 2:
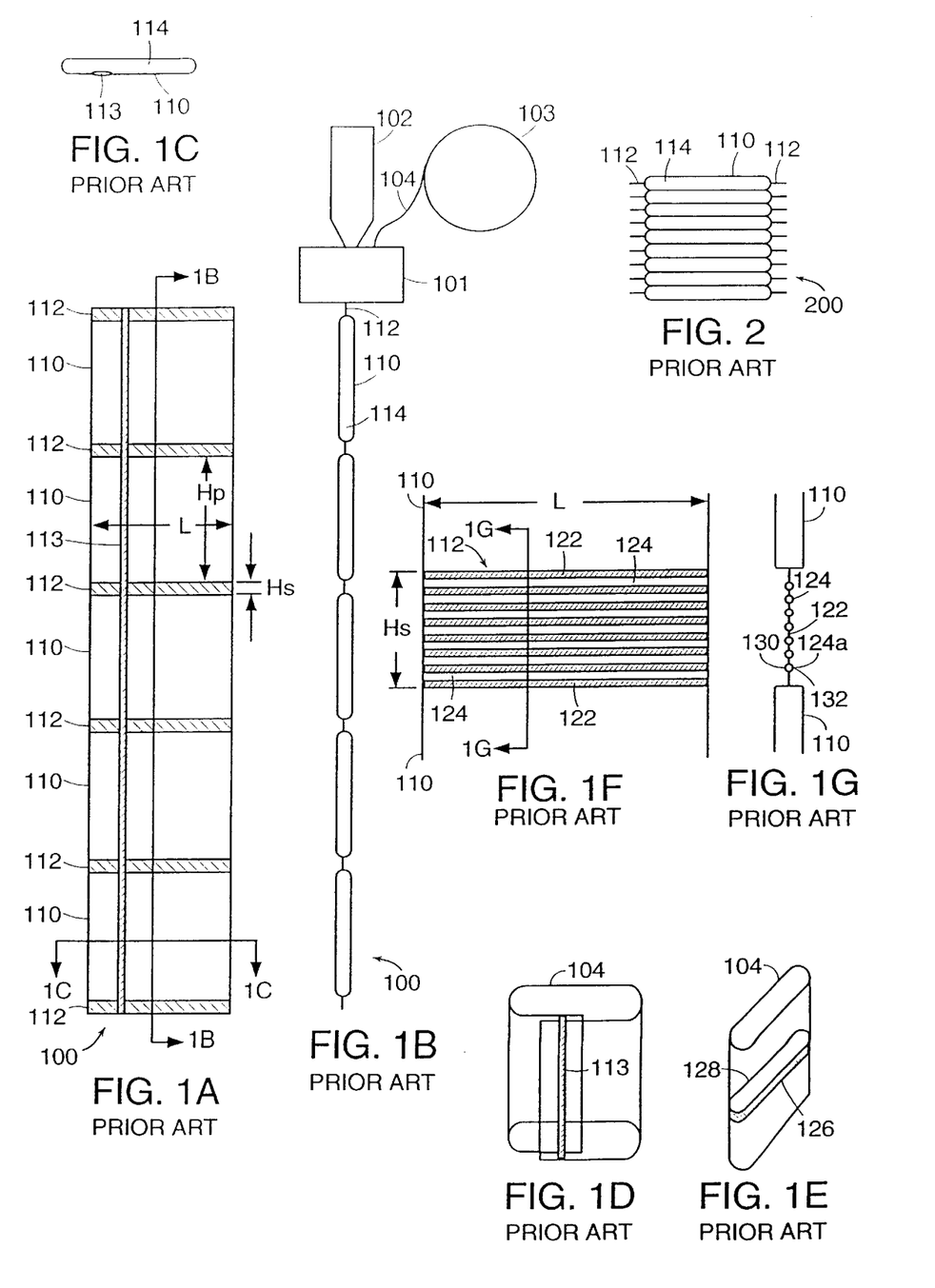
FIG. 1A shows a front view of a portion of a prior art chain of food items.
FIG. 1B shows a sectional view taken along the line 1B—1B of the chain shown in FIG. 1A, and also shows an apparatus for forming the chain.
FIG. 1C shows a sectional view taken along the line 1C—1C of the chain shown in FIG. 1A.
FIG. 1D shows a perspective view of a tube that is formed from the sheet of wrapping material by the apparatus indicated in FIG. 1B, and further shows the portions of the tube used to form the longitudinal seal area shown in FIGS. 1A and 1C.
FIG. 1E shows another perspective view of the tube that is formed from the sheet of wrapping material by the apparatus indicated in FIG. 1B, and further shows the portions of the tube used to form the transversal seal areas shown in FIGS. 1A and 1B.
FIG. 1F shows a magnified front view of one of the seal areas shown in FIGS. 1A and 1B.
FIG. 1G shows a sectional view taken along the line 1G—1G of the seal area shown in FIG. 1F.
FIG. 2 shows a prior art stack of individually wrapped food items.

FIG. 1A shows a front view of a portion of a prior art chain 100 of individually wrapped food items. FIGS. 1B and 1C show sectional views of chain 100 taken along lines 1B—1B and 1C—1C, respectively, as shown in FIG. 1A. FIG. 1B additionally shows figuratively an apparatus 101 for forming chain 100.

Chain 100 includes a series of packets 110. Each pair of adjacent packets 110 in chain 100 is separated by a transversal seal area 112. As shown in FIGS. 1A and 1C, a longitudinal seal area 113 also extends along one side of chain 100 in a direction substantially perpendicular to the transversal seal areas 112. As shown in FIGS. 1B and 1C, an item of food 114 (e.g., a slice of cheese) is encased within each packet 110. Each packet is characterized by a length L and a height Hp. Each transversal seal area 112 is characterized by a length L (equal to the length of the packets) and a height Hs. When the food items 114 are cheese slices, typical dimensions for L, Hp, and Hs are 86 mm (millimeters), 85 mm, and 15 mm, respectively.

Apparatuses for forming chain 100 are well known in the art and one example of apparatus 101 (indicated in FIG. 1B) is described in U.S. Pat. No. 3,542,570 (which is assigned to L. D. Schreiber Cheese Company, Inc. and which was invented by Robert G. Bush and Gilbert H. Hannon). Briefly, apparatus 101 is coupled to a source of food 102 and a large roll 103 of flexible wrapping material (e.g., cellophane). Roll 103 feeds a sheet of wrapping material 104 into apparatus 101 and food source, or nozzle, 102 injects food (e.g., viscous cheese) into apparatus 101. Apparatus 101 forms the sheet 104 into a tube as indicated generally in FIG. 1D, which shows a perspective view of a portion of the tube. Apparatus 101 also uses heat or pressure to form longitudinal seat area 113 by pressing overlapping portions of the tube together as indicated in FIG. 1D. Apparatus 101 also presses selected portions of sheet 104 together to form transversal seal areas 112 and thereby forms the sheet 104 into packets 110. For example, as shown in the perspective view of FIG. 1E, apparatus 101 presses portions 126 and 128 of sheet 104 together to form a single transversal seal area 112. Food source 102 injects the food item into the packets 110 as the packets are being formed. The sheet of wrapping material 104 used to form packets 110, seal areas 112, and seal areas 113 is preferably moisture proof and gas proof so the packets 110 can adequately preserve the freshness of the food items 114. Although FIGS. 1A and 1B only show five packets 110 in chain 100, those skilled in the art will appreciate apparatus 101 forms the chain 100 continuously, and the chain 100 can include many more packets 100.

FIG. 1F shows a magnified front view of one of the seal areas 112 shown in FIGS. 1A and 1B. FIG. 1G shows a sectional view of the seal area taken along the line 1G—1G shown in FIG. 1F. For convenience of illustration, the longitudinal seal area 113 is not shown in FIG. 1F. As shown, each seal area 112 includes eight parallel sealed strips 122 and seven unsealed strips 124, with an unsealed strip 124 separating each pair of adjacent sealed strips 122. Each of the sealed strips 122 and unsealed strips 124 extends across the full length L of the seal area 112. The sealed strips are typically formed by pressing portions of the sheet 104 of wrapping material tightly together and by locally heating the wrapping material (e.g., a strip of portion 126 and a strip of portion 128, as shown in FIG. 1E, would be pressed together to form a single sealed strip 122). At the sealed strips 122, the portions of wrapping material are permanently bonded together, and the sealed strips can not be "unsealed" without tearing or otherwise damaging the wrapping material. The collection of sealed strips 122 in seal area 112 forms a tight hermetic seal between the two adjacent packets 110 and thereby protects the freshness of the food items 114.

The unsealed strips 124 are formed by adjacent portions of the sheet 104 of wrapping material that have not been sealed together. As shown in FIG. 1G, a small amount of trapped air may separate the two portions of wrapping material at the unsealed strips 124. However, even if the trapped air were eliminated permitting the portions of wrapping material to contact one another at the unsealed strips 124, the portions of wrapping material would not be not bonded together at the unsealed strips 124. As shown in FIG. 1G, the unsealed strip 124a is formed by a portion 130 of sheet 104 (shown in FIG. 1B) and by a portion 132 of sheet 104 (shown in FIG. 1B). The portions 130, 132 are not bonded together and are held in place with respect to one another only by the adjacent sealed strips 122. The portions of the sheets used to form each of the unsealed strips are held in place with respect to one another only by the adjacent sealed strips.

In a typical food production process, after chain 100 is formed, the packets 110 are separated from one another (e.g., by slicing the seal areas 112 in half along their length L) and then stacked to form a stack 200 as shown in FIG. 2. Stack 200 is then normally encased in an outer wrapping (not shown), and sold as a collection of individually wrapped food items (e.g., individually wrapped slices of cheese).

Figure 3A:
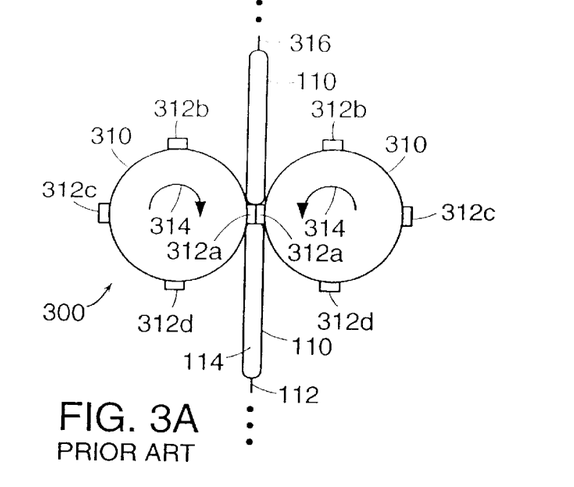
FIG. 3A shows a side view of a prior art apparatus for forming seal areas of the type shown in FIGS. 1A–1D.

FIG. 3A shows a side view of an apparatus 300 for forming seal areas 112. Apparatus 300 would normally be considered a part of apparatus 101 (shown in FIG. 1B). Apparatus 300 includes two wheels 310, and each of the wheels is studded with a set of four cleats 312a, 312b, 312c, and 312d. The chain 100 is threaded between the two wheels 310 and travels downwards as the wheels rotate synchronously in the directions indicated by arrows 314. In the position of apparatus 300 illustrated in FIG. 3A, cleats 312a from both wheels 310 are simultaneously pressing two portions of sheet 104 of wrapping material (between the two packets 110) together to form a seal area 112. The cleats 312 are typically heated so a combination of pressure and heat is used to form the seal areas 112. As the wheels 310 rotate, corresponding cleats from both wheels periodically meet to form one of the seal areas 112. Wheels 310 are disposed so their outer perimeters (in areas without cleats) are separated by a distance at least as large as the width of packet 110, so the packets 110 can pass undisturbed through the wheels 310 as the wheels rotate.

FIG. 3A shows a clamped area 316 at the top of the upper packet 110. Clamped area 316 is typically formed by clamping or squeezing the two sheets wrapping material together tightly enough to temporarily hold the sheets of wrapping material together, but not tightly enough to permanently bond the sheets of wrapping material together. Although clamped area 316 defines (at least temporarily) the shape of packet 110, the food item in the packet 110 is not adequately sealed (so as to preserve freshness) until the clamped area 316 passes through the cleats 312 of sealing apparatus 300 and is thereby turned into a proper seal area 112.

Figures 3B, 3C:
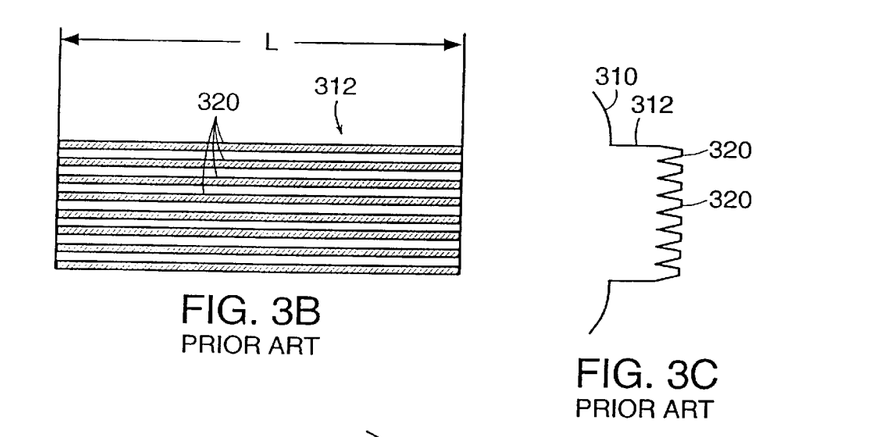
FIGS. 3B, 3C, and 3D show front, side, and perspective views, respectively, of one of the cleats in the apparatus shown in FIG. 3A.
Figure 3D:
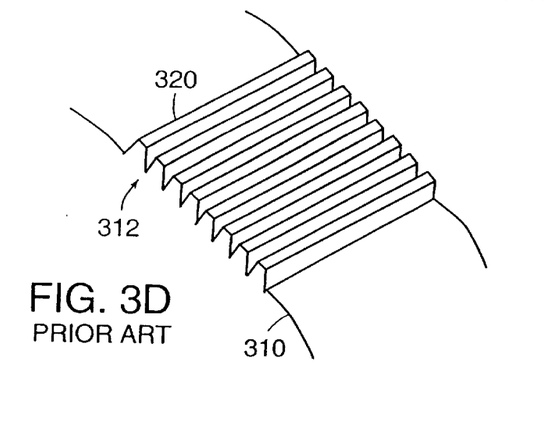
Figure 3E:
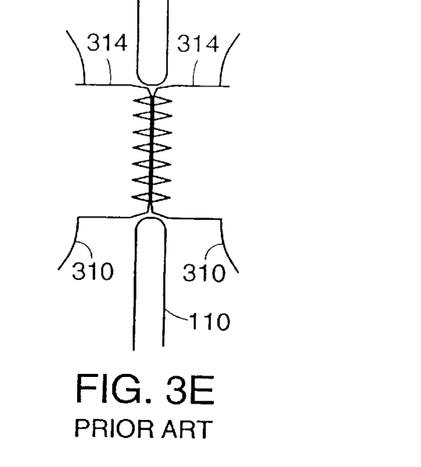
FIG. 3E shows a magnified view of two of the cleats from the apparatus shown in FIG. 3A forming a seal area.

FIGS. 3B, 3C, and 3D show magnified front, side, and perspective views, respectively, of one of the cleats 312 of apparatus 300. As shown, cleat 312 has a generally corrugated appearance and defines eight distinct bearing surface strips 320, with each of the bearing surface strips extending across the entire length L (equal to the length of the seal area 112) of the cleat 312. FIG. 3E shows a magnified side view of two cleats 314 meeting to form a seal area 312. As shown, the bearing surface strips 320 of the two opposing cleats press the wrapping material tightly together to form the eight sealed strips 122 of seal area 112. Although not illustrated, the cleats 314 are generally heated so a combination of heat and pressure are used to form the sealed strips 122.

Although the illustrated cleats provide eight relatively small bearing surface strips 320, it is possible to use cleats 312 that provide only a single relatively large bearing surface. Such a cleat would produce a seal area 112 having only a single sealed strip. However, it is well known that cleats of the form illustrated in FIGS. 3B–3E that provide a plurality of relatively small bearing surface strips produce much tighter, more effective, seal areas 112.

One disadvantage of seal areas 112 of the type shown in FIG. 1F is that they are very difficult to break or open. Customers must typically break or open these seal areas before they can consume the food items 114. Although it is desirable for the seal areas 114 to protect the freshness of the food item, the seal areas should also provide customers relatively easy access to the food items.

It is therefore an object of the present invention to provide seal areas in a chain of food items that (1) adequately protect the freshness of the food items and (2) are relatively easy for customers to open.

SUMMARY OF THE INVENTION

These and other objects are provided by a packet formed from flexible wrapping material for storing a food item. The packet defines an interior volume and includes a seal area. The seal area includes a plurality of sealed strips and a plurality of unsealed strips. At least one unsealed strip is disposed between each pair of sealed strips. Each of the sealed strips includes two portions of the wrapping material that have been bonded together. Each of the unsealed strips includes two adjacent portions of the wrapping material that have not been bonded together. Each of the sealed strips also includes at least one void area. Each void area includes two adjacent portions of the wrapping material that have not been bonded together. The void areas and the unsealed strips provide at least one continuous unsealed path from the interior of the packet through the seal area to an external environment.

The invention also provides a chain of food items including a plurality of such seal areas, an apparatus for making such seal areas, and a method for making such seal areas.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein.

DETAILED DESCRIPTION OF THE PREFERRED EMBODIMENTS

Figures 4A, 4B, 4C, 4D, 4E:
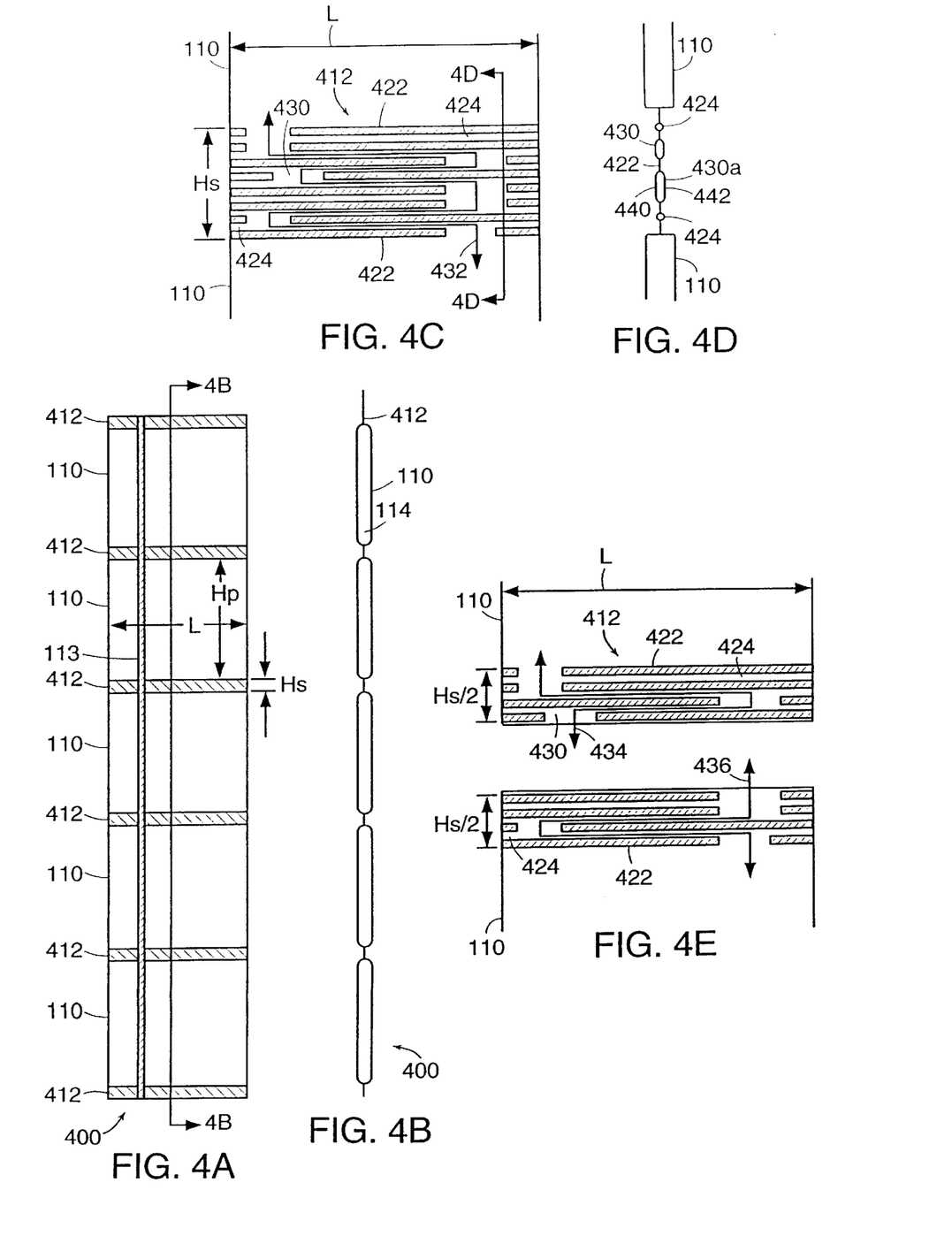
FIG. 4A shows a front view of a portion of an improved chain of food items constructed according to the invention.
FIG. 4B shows a sectional view taken along the line 4B—4B of the chain shown in FIG. 4A.
FIG. 4C shows a magnified front view of an improved seal area constructed according to the invention.
FIG. 4D shows a sectional view taken along the line 4D—4D of the seal area shown in FIG. 4C.
FIG. 4E shows a magnified front view of the seal area shown in FIGS. 4C and 4D after the seal area has been sliced in half along its length.

FIG. 4A shows a front view of a portion of an improved food chain 400 constructed according to the invention. FIG. 4B shows a sectional view taken along the line 4B—4B of the chain 400 shown in FIG. 4A. As with prior art food chain 100, improved food chain 400 includes a plurality of packets 110 with a food item 114 being encased within each packet 110. However, rather than prior art hermetic transversal seal areas 112, the packets 110 in chain 400 are separated by improved non-hermetic transversal seal areas 412.

FIG. 4C shows a magnified front view of one of the improved seal areas 412. For convenience of illustration, the longitudinal seal area 113 is not shown in FIG. 4C. FIG. 4D shows a cross sectional view taken along line 4D—4D of the seal area 412 shown in FIG. 4C. Seal area 412 includes eight parallel sealed strips 422 and seven unsealed strips 424, with an unsealed strip 424 separating each pair of adjacent sealed strips 422. Unlike prior art sealed strips 122 (shown in FIG. 1F), the sealed strips 422 of seal area 412 do not extend across the full length L of seal area 412. Rather, the total length of each sealed strip 422 is less than the length L of the seal area 412. At least one void area 430 interrupts each of the sealed strips 422 and prevents the sealed strips from extending across the entire length of seal area 412. The illustrated unsealed strips 424 do extend across the entire length L of the seat area 412. With the exception of the void areas 430 (where the portions of wrapping material are not bonded together), the portions of wrapping material used to form the sealed strips 422 have been permanently bonded together.

The portions of wrapping material used to form both the unsealed strips 424 and the void areas 430 are not bonded together and are held in place with respect to one another only by the near by sealed strips 422. For example, as shown in FIG. 4D, void area 430a is formed by a portion 440 of sheet 104 (as shown in FIG. 1B) and by a portion 442 of sheet 104 (as shown in FIG. 1B). The portions 440 and 442 that form unsealed strip 430a are not bonded together and are held in place with respect to one another only by the near by sealed strips. As with the prior art unsealed strips 124, the portions of wrapping material used to form the unsealed strips 424 and the void areas 430 may be separated by a small amount of trapped air. As indicated by arrow 432 (in FIG. 4C), a continuous unsealed region (or pathway) extends through improved seal area 412 between adjacent packets 110. After adjacent packets 110 are separated to, for example, form a stack of individually wrapped food items as illustrated in FIG. 2, the void areas 430 and unsealed strips 422 will provide a continuous unsealed region extending from inside packet 110 through seal area 412 into the ambient environment. For example, FIG. 4E shows the configuration of the two packets 110 shown in FIG. 4C after the seat area 412 has been sliced in half along its length L. As shown by the arrows 434, 436 in FIG. 4E, a continuous unsealed region extends from the packets 110 (through the sealed strips 422 of seat area 412) into the ambient environment. As also shown in FIG. 4E, packets 110 are preferably separated by slicing the seal area in half so that each separated packet 110 is bordered by a portion of seal area 412 having a height substantially equal to Hs/2 (i.e., one half the total height of the seal area 412).

The seal area 412 therefore does not provide a hermetic, "air tight", seal. However, the amount of gas that can pass through seal area 412 under normal conditions is sufficiently small so as to adequately protect the freshness of the food items 114. Further, the presence of the void regions 430 significantly reduces the amount of force required for a customer to break or open the seal area 412 and thereby gain access to the food item. Improved seal area 412 thereby overcomes a problem with prior art seal areas (1) by adequately protecting the freshness of the food items and (2) by being relatively easy for customers to open.

The unsealed region or path that extends through the seal area 412 is preferably circuitous. For example, as shown in FIGS. 4C and 4E by arrows 432, 434, 436, the unsealed path preferably "zig-zags" back and forth several times before traversing the entire seal area. In preferred embodiments, the unsealed path includes at least six 180 degree turns (four such 180 degree turns being illustrated in FIG. 4C). Of course, if the unsealed path through seal area 412 includes six 180 degree turns, then after the seal area has been sliced in half to separate two adjacent packets, the unsealed path through each half of the seal area bordering one of the packets will include three 180 degree turns. Also, as is apparent from FIG. 4C, any vertical line drawn across the seal area 412 will intersect at least one of the sealed strips 422. Preferably, the void areas 430 are disposed so that any line drawn across the seal area 412 perpendicular to the sealed strips will intersect at least half of the sealed strips 422.

Figure 5A:
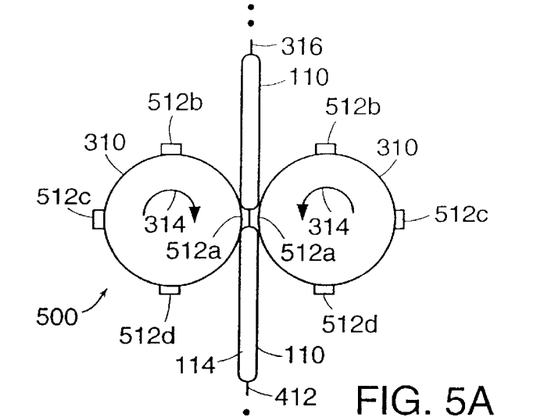
FIG. 5A shows a side view of an improved apparatus constructed according to the invention for forming improved seal areas of the type illustrated in FIGS. 4A–4E.
Figure 5B:
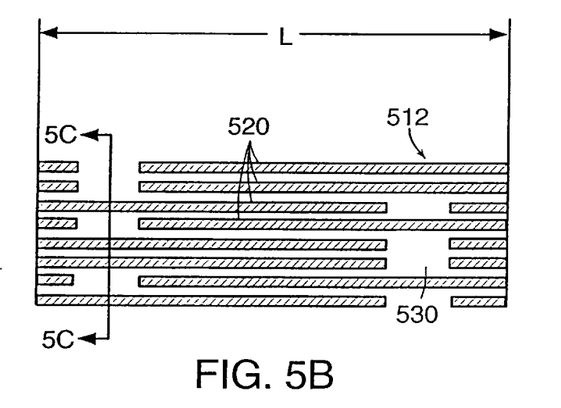
FIG. 5B shows a front view of one of the improved cleats shown in FIG. 5A constructed according to the invention.
Figure 5C:
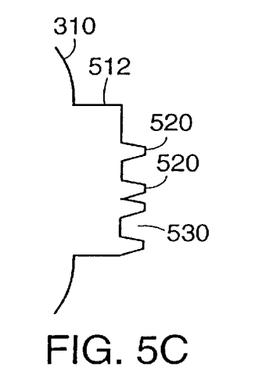
FIG. 5C shows a sectional view taken along the line 5C—5C of the cleat shown in FIG. 5B.
Figure 5D:
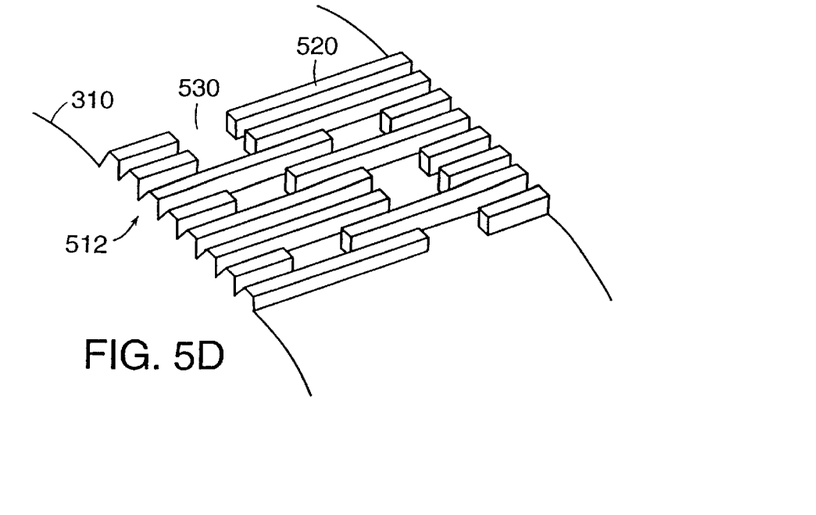
FIG. 5D shows a perspective view of the cleat shown in FIGS. 5B and 5C.
Figure 6A:
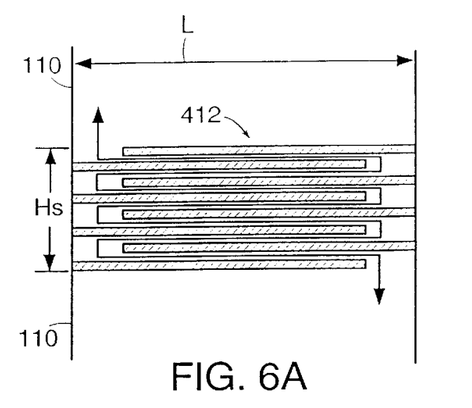
FIGS. 6A–6D illustrate different embodiments of seal areas constructed according to the invention.
Figure 6B:
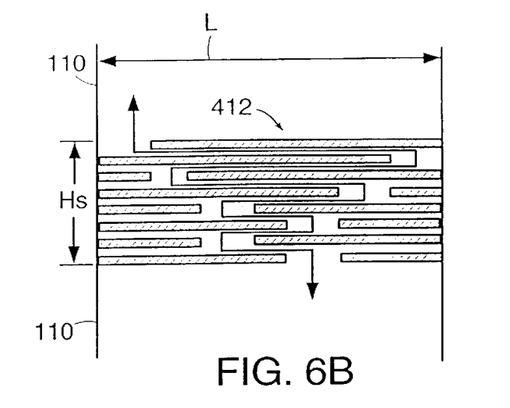
Figure 6C:
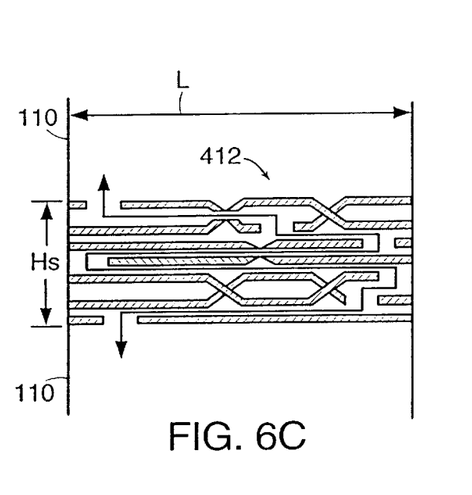
Figure 6D:
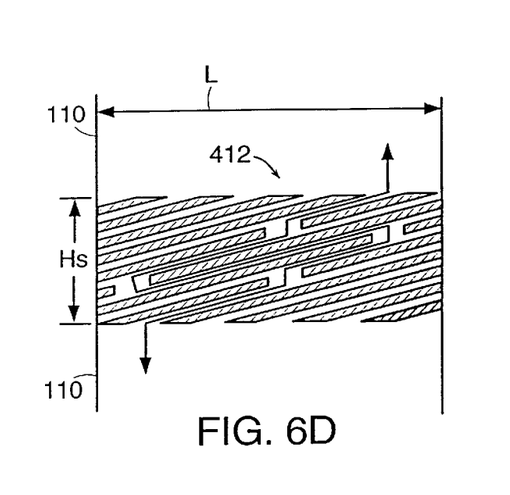

FIG. 5A shows a side view of an apparatus 500 constructed according to the invention for forming improved seal areas 412. Apparatus 500 is similar to prior art apparatus 300 (shown in FIG. 3A), however, rather than prior art cleats 312, the wheels 310 of apparatus 500 are studded with improved cleats 512. FIG. 5B shows a front view of an improved cleat 512 constructed according to the invention. FIG. 5C shows a sectional view taken along line 5C—5C of the cleat 512 shown in FIG. 5B. FIG. 5D shows a perspective view of the cleat 512 shown in FIGS. 5B and 5C. As shown, improved cleat 512 defines eight distinct bearing surface strips 520. However, unlike the bearing surface strips 320 of prior art cleat 312, the bearing surface strips 520 of improved cleat 512 do not extend across the full length L of cleat 512 (the length of the cleat 512 being equal to the length of the seal area 412). Rather, each of the bearing surface strips 520 is interrupted by at least one void region 530. In operation, as the bearing surface strips 520 from two cleats 512 press the wrapping material together (and/or heat the wrapping material) to form the sealed strips 422, the void regions 530 prevent portions of the sheets of wrapping material from being pressed together and thereby form the void areas 430 as the sealed strips 422 are being formed.

As those skilled in the art will appreciate, numerous variations may be made from the illustrated embodiments of cleats 512 and seat area 412, all of which are embraced by the invention. For example, although use of eight parallel seated strips 422 (and eight bearing surface strips 520) have been disclosed for forming a single seal area 412, more or less than eight may be used, and the seated strips need not be parallel. Also, the size and location of the void areas 430 (and void regions 530) may be varied. FIGS. 6A–6D illustrate different examples of seal areas 412 contemplated by the invention. Also, in apparatus 500 only one of the pair of cleats used to form seal area 412 needs to be improved cleat 512. For example, prior art cleat 312 and improved cleat 512 may be used together (each being disposed on one of the wheels 310) to form an improved seal area 412. Also, the improved seal area has always been discussed as being the transversal seal area separating the packets 110 of chain 100. However, in alternative embodiments, longitudinal seat area 113 may be formed as an improved non-hermetic seal area as disclosed herein and the transversal seal areas may be formed as either prior art seal area 112 or improved seal area 412. As another example, the packets 110 have been described as being formed from a single sheet of wrapping material. Those skilled in the art will appreciate that rather than a single sheet, two sheets may be used to form the packets with portions of material from both sheets being pressed together to form the seal areas. Further, while use of pressure and heat have been discussed for forming the sealed strips, those skilled in the art will appreciate that the sealed strips could be alternatively be formed by use of adhesives or other means.

Figure 7A:
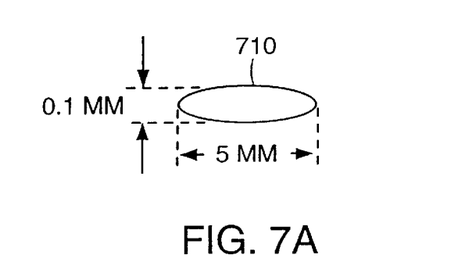
FIG. 7A shows a cross sectional view of the unsealed path that passes through improved seal areas constructed according to the invention, the cross sectional view being taken at a point where the unsealed path passes through one of the void areas shown in FIG. 4C.
Figure 7B:
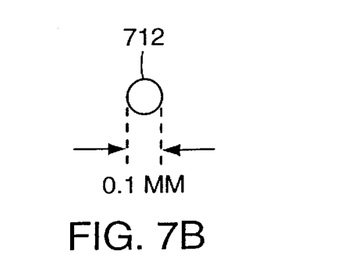
FIG. 7B shows a cross sectional view of the unsealed path that passes through improved seal areas constructed according to the invention, the cross sectional view being taken at a point where the unsealed path passes through one of the unsealed strips shown in FIG. 4C.
Figure 8A:
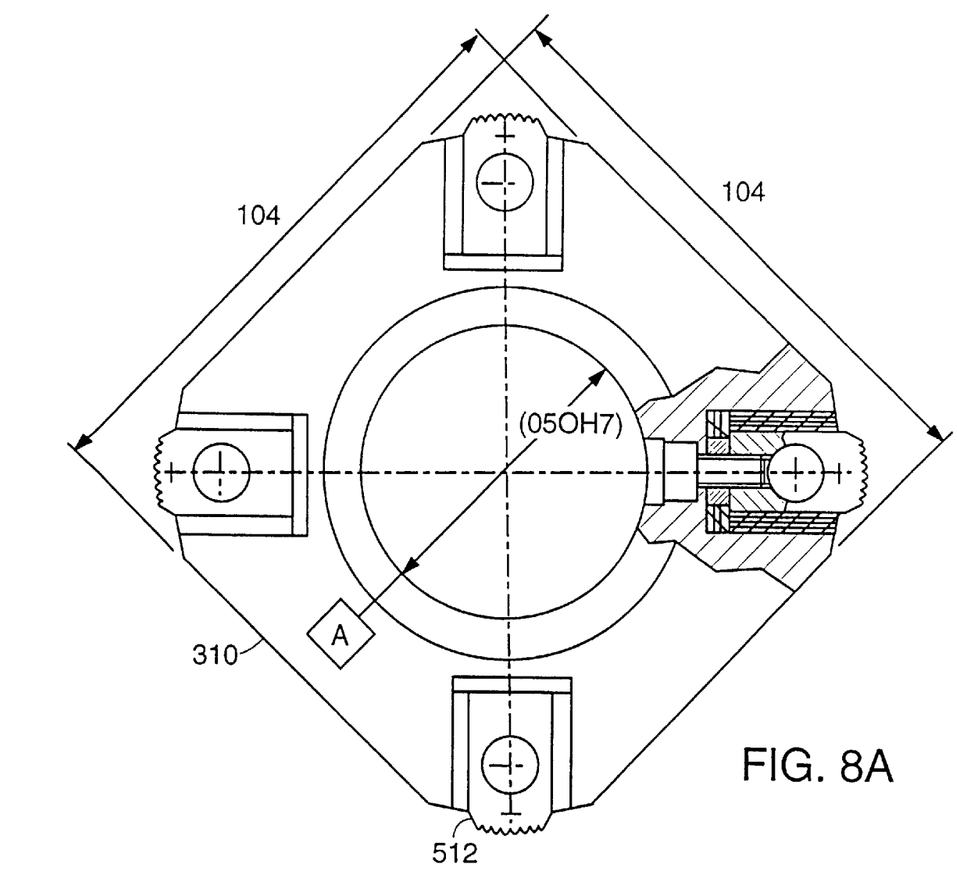
FIG. 8A shows a side view of a preferred embodiment of one of the wheels and cleats used in the apparatus shown in FIG. 5A.
Figure 8B:
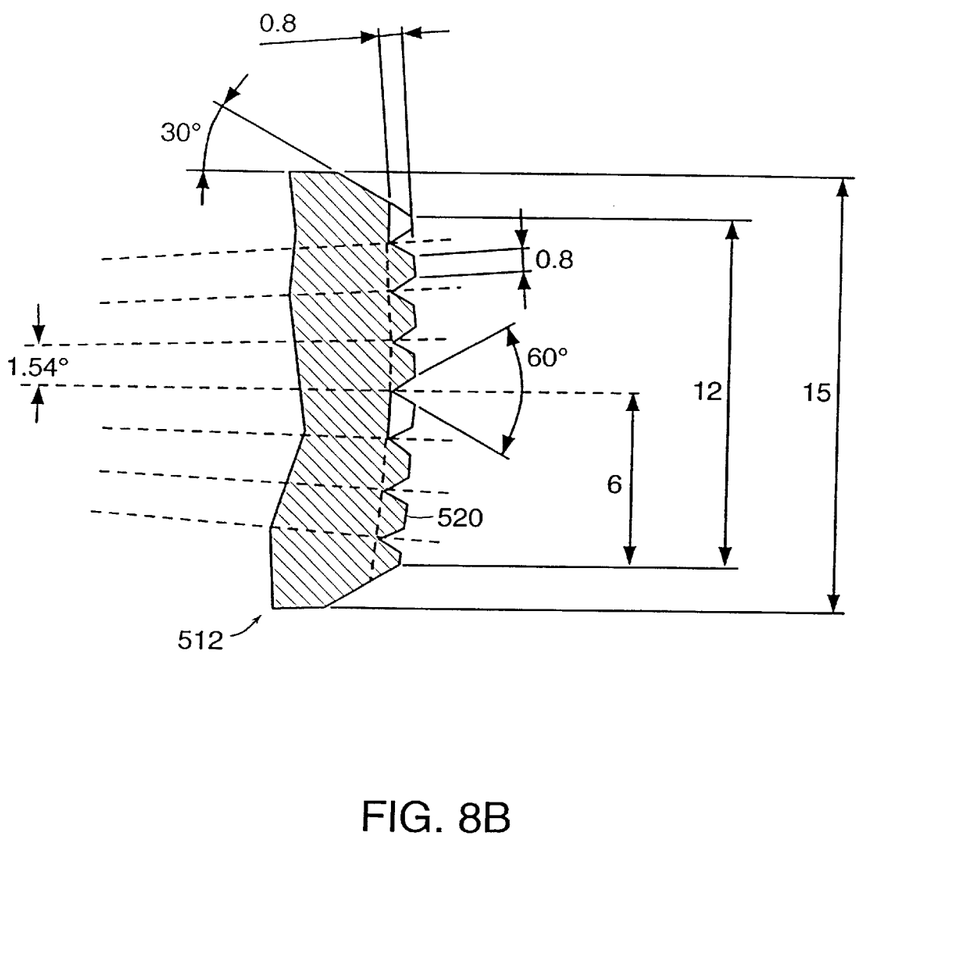
FIG. 8B shows a magnified side view of one of the cleats shown in FIG. 8A.
Figure 8C:
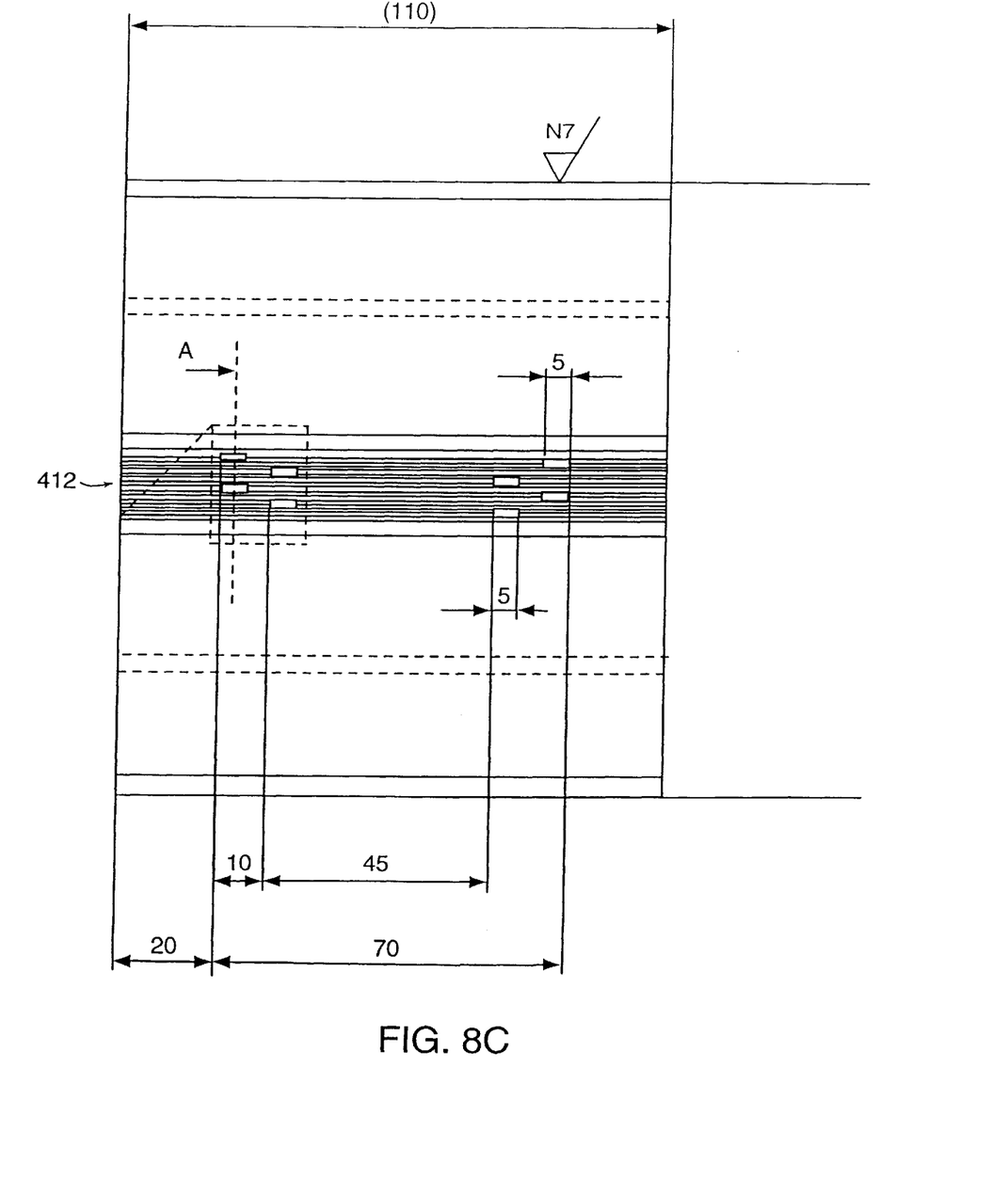
FIG. 8C shows a front view of a seal area constructed according to the invention and FIG. 8D shows a magnified view of the portion of the seal area that is outlined by the dashed square in FIG. 8C.
Figure 8D:
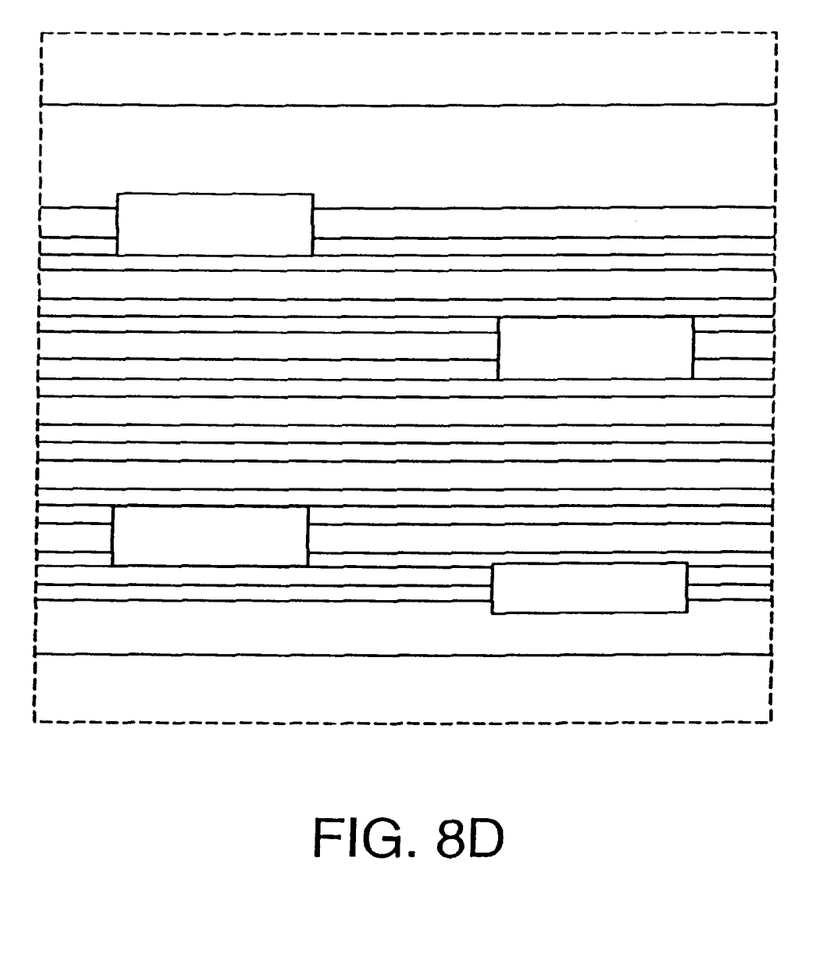

All of the non-hermetic seal areas 412 constructed according to the invention provide a continuous unsealed region (or pathway) that extends through the seal area. Preferably, this path is circuitous (as shown in FIG. 4C by arrow 432) to restrict the amount of gas that may flow through the seal area. In one preferred embodiment, the height of the seal areas 412 is 15 mm, the height of the unsealed strips 424 is 1 mm, the height of the sealed strips 422 is 0.8 mm; the length of the seal area L is 110 mm, and the length of the void regions 430 is 5 mm. As discussed above, the void areas 430 and the unsealed strips 424 provide an unsealed path that extends through the seal area. In one preferred embodiment, the length of the unsealed path is 450 mm. FIGS. 7A and 7B show two cross sectional views of the unsealed path that extends through the seal area taken at different points along the path. FIG. 7A shows a cross section 710 of the unsealed path taken at a point where the path is passing through one of the void regions 430 (FIG. 4C), and FIG. 7B shows a cross section 712 of the unsealed path taken at a point where the path is passing through one of the unsealed strips 424 (FIG. 4C). As shown in FIGS. 7A and 7B, the unsealed path is typically larger in the void regions than in one of the unsealed strips. In one preferred embodiment, the major axis of the unsealed path's opening is not larger than 5 mm (as shown in FIG. 7A), and the minor axis of the unsealed path's opening is about 0.1 mm (as shown in FIGS. 7A and 7B).

FIGS. 8A–D illustrate preferred embodiments of cleats and seal areas constructed according to the invention. Unless otherwise indicated on the drawing, dimensions in FIGS. 8A–D are in millimeters.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A packet formed from flexible wrapping material storing a perishable food item, the packet defining an interior volume and including a seal area, the seal area including a plurality of sealed strips and a plurality of unsealed strips, at least one unsealed strip being disposed between each pair of sealed strips, each of the sealed strips including two portions of the wrapping material that have been bonded together, each of the unsealed strips including two adjacent portions of the wrapping material that have not been bonded together, each of the sealed strips including at least once void area, each void area including two adjacent portions of the wrapping material that have not been bonded together, the void areas and the unsealed strips providing at least one continuous unsealed path from the interior of the packet through the seal area to an external environment, the at least one continuous unsealed path reducing the amount of force required to open the seal area to gain access to the food item stored therein at the time of consumption and maintaining the freshness of the food item stored therein by limiting the amount of gas that passes through the sealed area under normal storage conditions.

2. A wrapper according to claim 1, wherein all of the sealed strips are substantially parallel to one another.

3. A wrapper according to claim 1, wherein the sealed strips are formed by pressing a first portion and a second portion of the wrapping material together.

4. A wrapper according to claim 3, wherein the sealed strips are formed by heating the portions of the wrapping material that are pressed together.

5. A wrapper according to claim 1, wherein the food item comprises a cheese food.

6. A chain of wrapped food items, the chain comprising a plurality of packets and a plurality of seal areas, the packets and the seal areas being formed from a flexible wrapping material, each packet and its adjacent seal areas defining interior volume storing one of the food items, each pair of adjacent packets being separated by at least one seal area, the at least one seal area comprising a plurality of sealed strips and a plurality of unsealed strips, each of the sealed strips including two portions of the wrapping material that have been bonded together, each of the unsealed strips including two adjacent portions of the wrapping material that have not been bonded together, each of the sealed strips including at least one void area, each void area including two adjacent portions of wrapping material that have not been bonded together, the void areas and the unsealed strips providing at least one continuous unsealed path through the at least one seal area between the pair of packets, the at least one continuous unsealed path reducing the amount of force required to open the seal area to gain access to the food item stored therein at the time of consumption and maintaining the freshness of the food item stored therein by limiting the amount of gas that passes through the sealed area under normal storage conditions.

* * * * *

UNITED STATES PATENT AND TRADEMARK OFFICE
CERTIFICATE OF CORRECTION

PATENT NO. : 6,265,002 B1  Page 1 of 1
DATED : July 24, 2001
INVENTOR(S) : Rene Blatter It is certified that error appears in the above-identified patent and that said Letters Patent is hereby corrected as shown below:

<u>Column 8,</u>
Line 16, "once" should be -- one --.
Line 26, "sealed" should be -- seal --.
Line 41, following "defining," please insert -- an --.
Line 51, following "of," please insert -- the --.
Line 59, "sealed" should be -- seal --.

Signed and Sealed this

Eighth Day of April, 2003

JAMES E. ROGAN
*Director of the United States Patent and Trademark Office*